W. W. HUMPHREY.
Curved Street-Rail.

No. 202,945.    Patented April 30, 1878.

WITNESSES

INVENTOR
William W. Humphrey
By attorney

UNITED STATES PATENT OFFICE.

WILLIAM W. HUMPHREY, OF BOSTON, MASSACHUSETTS.

IMPROVEMENT IN CURVED STREET-RAILS.

Specification forming part of Letters Patent No. 202,945, dated April 30, 1878; application filed January 14, 1878.

*To all whom it may concern:*

Be it known that I, WILLIAM W. HUMPHREY, of Boston, in the county of Suffolk and Commonwealth of Massachusetts, have invented a new and useful Improvement in Street-Railway Rails for Curves, of which the following is a specification:

This invention is intended to obviate the binding effect of the car-wheel running on the inner or short curved rail of an ordinary street-railway. As the car turns to follow a curve to the right or left the wheel on the inner or short curve will slide and bind, thus requiring an increased outlay of strength on the part of the horses in order to draw the car around the curve. For this reason an extra horse generally has to be used at the curves, and more especially on an up-hill curve. This binding effect of the car-wheel tends to wear the wheels, the journals of the axle, and the rails, and to strain the car. It is estimated that the wear of cars and wheels, &c., is as much in going around one of the curves in ordinary use on street-railways as in passing over many miles of good straight track.

The object of my invention is to provide a sufficient number of rollers or wheels, to be placed in the tread of the rail, to be made of steel or other suitable metal, with trunnions resting in grooves made on both sides of the slot cut in the tread of the rail. The said grooves may have depressions for each trunnion, the trunnions turning therein so that one roller or wheel may not crowd upon the other, or the rollers may be made to run in the slot in the tread of the rail without depressions for the trunnions, and with guards overlapping the top of the slot in the tread of the rail.

Figure 1:
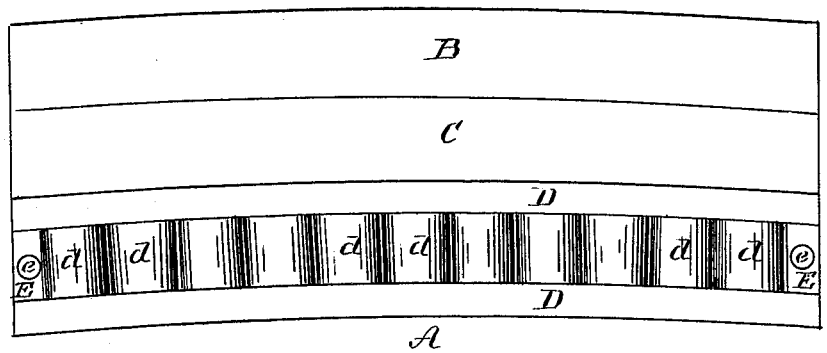
Figure 2:
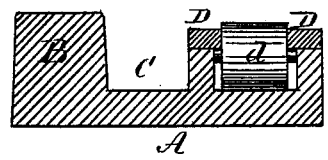
Figure 4:
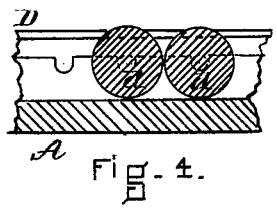
Figure 3:
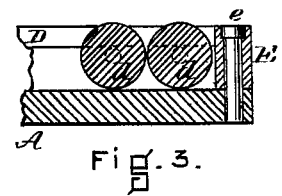

In the accompanying drawings, in which similar letters of reference indicate like parts, Figure 1 is a plan view of the device embodying my invention. Fig. 2 is a vertical cross-section of the same. Fig. 3 is a vertical longitudinal section, showing the rollers or wheels, with their trunnions, running under the guards in the slot. Fig. 4 is a vertical longitudinal section of a modification of the same, showing the trunnions of the rollers or wheels resting in depressions below the grooves in the slot of the tread of the rail.

B represents the flange of the rail, which is made higher than the tread of the rail, for curves. C is the groove, in which the flange of the car-wheel runs. D is the tread of the rail. *d d* are the rollers or wheels, with their trunnions.

A slot is made in the tread of the rail of the requisite depth, so that the rollers or wheels will just project above the top of the tread. It is intended that the rollers or wheels shall rest upon the bottom of the slot or mortise in the tread of the rail, to bear the weight of the car or heavy teams passing over them.

A piece of metal, E, may be inserted in the end of the slot or mortise in the tread of the rail, coming up flush with the top of the tread, with a hole drilled through it and the bottom of the rail, and fastened or held in place by a pin, *e*, thus allowing, upon removal of the pin and piece of metal at the end of the rail, the rollers or wheels to be taken out, and the dirt, dust, or other obstructing matter to be removed.

The operation of my device is as follows: The flange of the car-wheel running in the groove C of the rail, the tread of the wheel will run on the rollers or wheels inserted in the tread of the rail, which, revolving, will relieve the binding of the wheel which takes place in passing over the flat surface of the tread of the common curved rail.

I do not claim as my invention the form of the curved street-rail as now in use; but What I do claim is—

A curved street-rail made as described, with rollers inserted in the tread of the rail, as described, and for the purpose set forth.

WILLIAM W. HUMPHREY.

Witnesses:
GEORGE E. BELTON,
F. A. SHUTE.